United States Patent [19]

Morsbach

[11] Patent Number: 5,141,354
[45] Date of Patent: Aug. 25, 1992

[54] QUICK ACTING CONNECTOR ASSEMBLY

[76] Inventor: Carl E. Morsbach, 301 N. Adams, Freeport, Ill. 61032

[21] Appl. No.: 764,708

[22] Filed: Sep. 24, 1991

[51] Int. Cl.5 ............................................. B25G 3/18
[52] U.S. Cl. ................. 403/322; 403/407.1; 4/239
[58] Field of Search ................. 403/405.1, 406.1, 322, 403/407.1; 4/239

[56] References Cited

U.S. PATENT DOCUMENTS

| | | | |
|---|---|---|---|
| 1,276,312 | 8/1918 | Ballenberg | 403/407.1 |
| 1,319,533 | 10/1919 | Rice | 403/322 X |
| 4,317,416 | 3/1982 | Baum et al. | 403/407.1 X |
| 4,844,565 | 7/1989 | Brafford et al. | 403/322 X |
| 4,964,179 | 10/1990 | Kimes | 4/239 |

Primary Examiner—Andrew V. Kundrat
Attorney, Agent, or Firm—McCaleb, Lucas & Brugman

[57] ABSTRACT

A quick acting connector assembly is described for interlocking a portable member, such as a toilet seat, to a stationary member, such as a toilet, for example. The portable member carries a mounting bracket fixed to one margin thereof to present a planar flange or platform carrying headed pins projecting from one face thereof, with each pin located adjacent an enlarged opening receptive of a headed locking post extending from an underlying mounting plate fixed to the stationary member in assembly. A slide bar having a centrally disposed actuator and spaced key hole slots fits over the bracket's platform so that the pins fixed to said platform and the posts projecting from the mounting plate engage the key hole slots in assembly; the actuator depending beneath said slide bar to engage an elongated guide slot in the bracket platform while the outer end thereof is coupled to a pivotally actuated operator for selectively moving the slide bar between locking and unlocking positions beneath the heads of the locking posts. Detents serve to arrest the slide bar in its locking and unlocking positions to respectfully couple and release the removeable and stationary members.

10 Claims, 2 Drawing Sheets

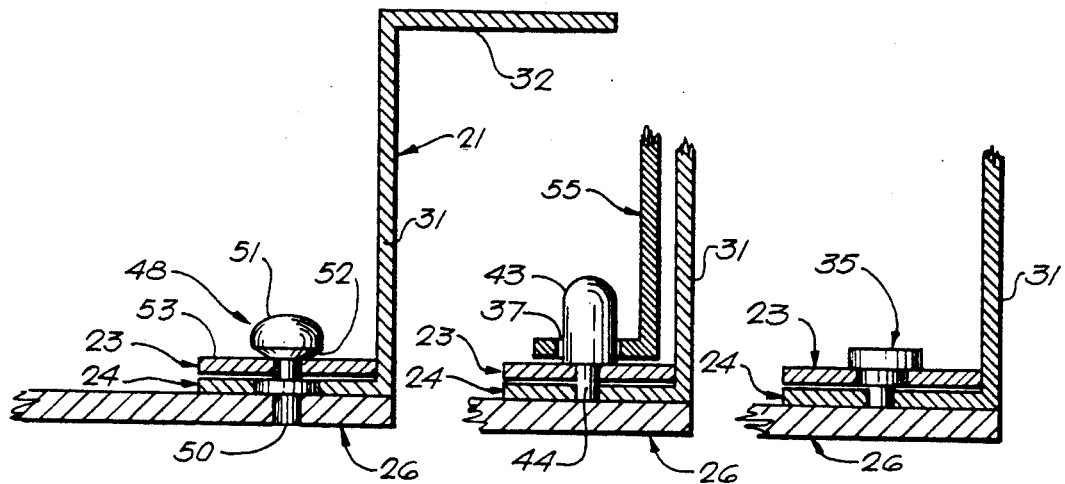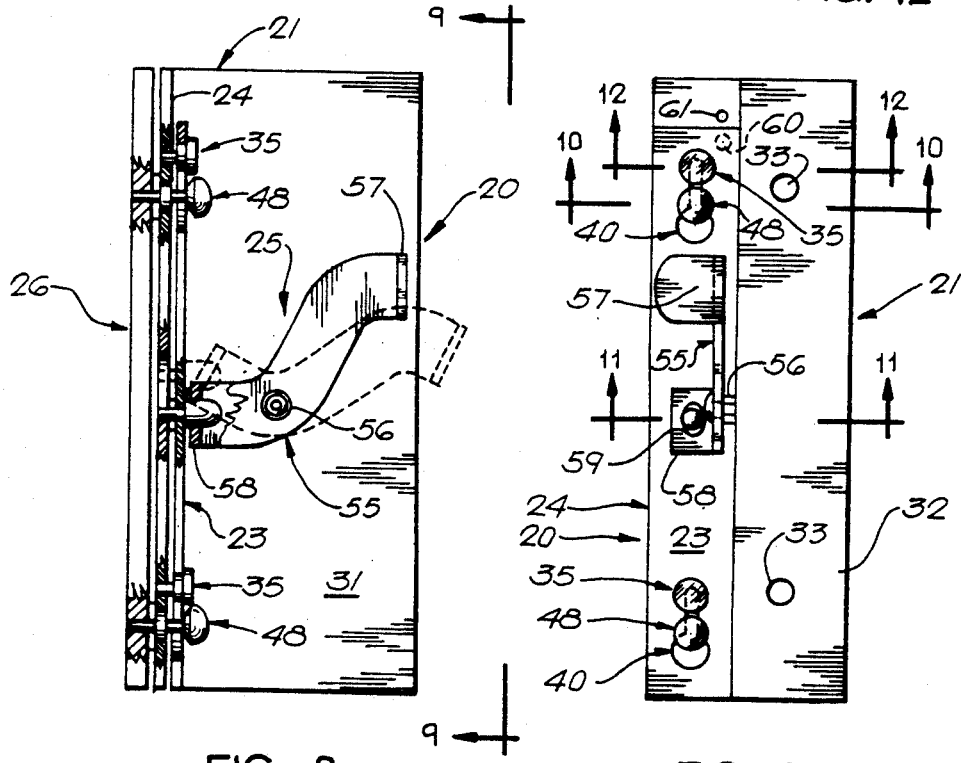

QUICK ACTING CONNECTOR ASSEMBLY

This invention is related generally to assemblies and more particularly to novel hardware for attaching a portable member to a stationary member.

BACKGROUND OF THE INVENTION

For purposes of illustrating the merits of this invention the same is hereinafter described in association with a toilet seat assembly for use by the disabled and of the general order set out in U.S. Pat. No. 4,964,179, issued Oct. 23, 1990, wherein an elevated toilet seat is stationarily mounted on a conventional toilet, either in a semi-permanent or removeable fashion. As therein shown and described a hardware assembly for mounting the elevated seat onto the toilet comprises one part which is stationarily fastened to the toilet adjacent the rearward end of the toilet bowl and a second part which is attached to a portable toilet seat. The two parts are interjoined by means of a socket on the toilet secured first part which receives a protruding tongue on the seat attached part. The two parts may be locked together in a semi-permanent installation by securing the tongue in the socket or adapted for quick detachment leaving the tongue free for withdrawal from the socket.

BRIEF SUMMARY OF THE INVENTION

This invention is directed to an improved connector assembly for detachably interconnecting one member, such as a portable toilet seat for the disabled, to a stationary member, such as a conventional toilet so that the portable member may be quickly and conveniently secured to and detached from the stationary member.

To that end, a mounting bracket sub assembly attachable to the portable member presents an elongated planar flange or platform portion having slidable connection with a slide bar guided for linear movements relative to said flange. A mounting plate adapted to be stationarily secured to an underlying support has a pair of upwardly projecting locking posts located to pass through co-axially aligned openings in the bracket flange and through enlarged ends of key hole slots formed in the slide bar when the bracket flange and slide bar are superposed on the stationary mounting plate. Manually actuated operator means serve to linearly actuate the slide bar to engage or disengage the stems of said locking posts in the elongated portions of the key hole slot therein; the heads of said posts having cam surfaces operable to frictionally engage the upper surface of the slide bar to effectively clamp the flange, slide bar and stationary members together. Means are provided for limiting linear movement of the slide bar and detent means serve to arrest the slide bar at least one of such limits of movement.

It is a primary object of this invention to provide an improved hardware assembly for effecting detachable interconnection between stationary and removeable members.

It is another object of this invention to provide a hardware assembly of the character set out in the preceding object which affords quick connect and disconnect functions between interlockable parts thereof.

A still further object of this invention is to provide a relatively simple, positive acting hardware assembly for interconnecting a portable member to a stationary member and which incorporates manually operable means for effecting quick attachment and release of the portable member.

Having described this invention the above and further objects, features and advantages thereof will appear to those skilled in the art from the following detailed description of a preferred embodiment thereof illustrated in the accompanying drawings and representing the best mode presently contemplated for enabling those of skill in the art to practice the same.

IN THE DRAWINGS

FIG. 3 is a cross sectional view taken substantially along vantage line 3—3 of FIG. 2 and looking in the direction of the arrows thereon;

FIG. 5 is a cross sectional view taken substantially along line 5—5 of FIG. 4 and looking in the direction of the arrows thereon;

FIG. 7 is a cross sectional view taken substantially along vantage line 7—7 of FIG. 6 and looking in the direction of the arrows thereon;

FIG. 8 is a front elevational view of the connector assembly shown in FIG. 1;

FIG. 9 is a top plan view of the assembly shown in FIG. 8;

FIG. 10 is a cross sectional view taken substantially along vantage line 10—10 of FIG. 9 and looking in the direction of the arrows thereon;

FIG. 11 is another cross sectional view taken substantially along vantage line 11—11 of FIG. 9 and looking in the direction of the arrows thereon; and FIG. 12 is still another cross sectional view taken substantially along vantage line 12—12 of FIG. 9 and looking in the direction of the arrows thereon.

DESCRIPTION OF THE PREFERRED EMBODIMENT

Figure 1:
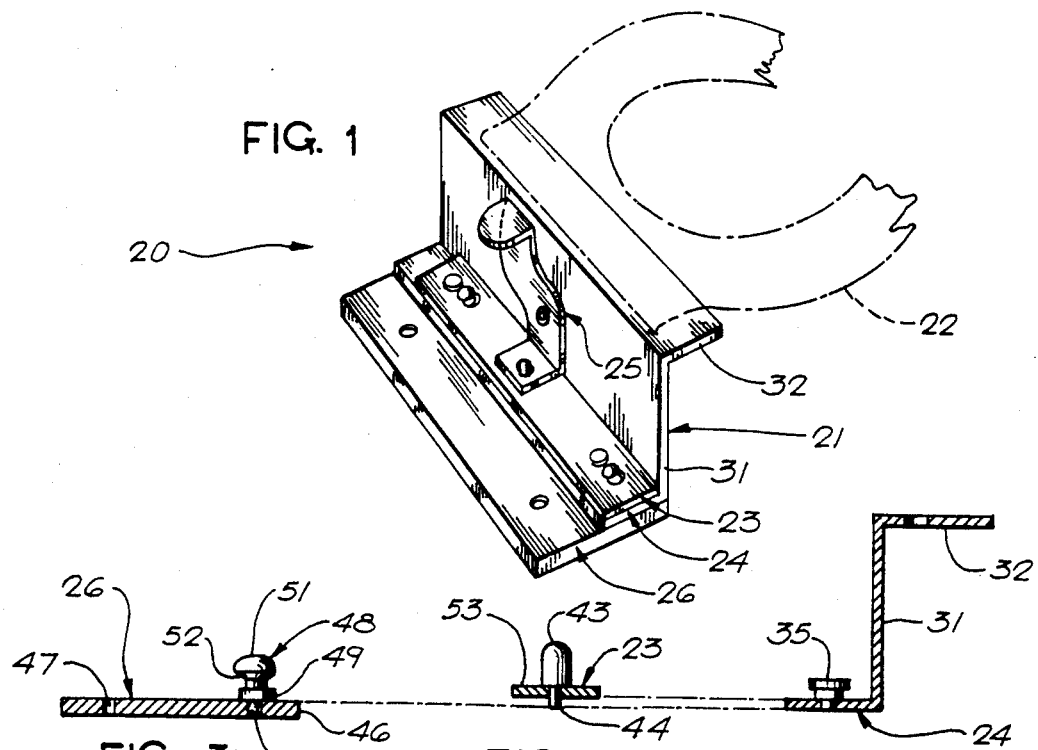
FIG. 1 is a perspective view of a connector assembly according to this invention for joining an elevated toilet seat to a stationary support.

Turning now to the general features of the preferred embodiment illustrated in the drawings, FIG. 1 demonstrates the characteristics of the connector assembly, generally indicated at 20, as comprising a mounting means 21 fastened to the base end of an elevated toilet seat 22, indicated by dotted lines and constituting a portable member. A slide bar 23 is arranged to slide over a planar platform portion 24 of the mounting means in response to selected activation of an actuator means 25 carried by the mounting means whereby to selective couple or release the mounting means, and thus the attached seat 22, from a stationary planar mounting plate 26, fixed to the upper end of a familiar floor mounted toilet (not shown).

While the presently preferred use of this invention with a stationary toilet and a portable elevated toilet seat, particularly useful to spinally injured disabled persons is illustrative of its utility, it is fully contemplated that the connector assembly hereof is equally useful for detachably interjoining other stationary and portable members with equal facility.

With reference now to FIGS. 1-7 of the drawings the particulars of the mounting means 21, slide bar 23 and mounting plate 26 will now be described more fully.

Figure 2:
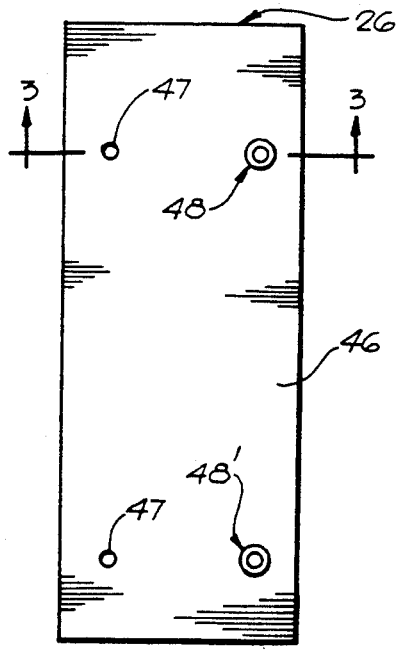
FIG. 2 is a top plan view of the mounting plate shown in FIG. 1 for attachment to a stationary member.

As shown in FIGS. 1-3, the mounting means 21 is herein shown as an elongated metal (preferably stainless steel for use in a toilet environment) bracket of general Z-shaped cross section (see FIGS. 1 and 7) formed by a planar connector platform portion 24, a planar body portion 31 extending at right angles to portion 24 and a planar seat attachment portion 32 parallel to portion 24 at the operationally upper end of body portion 31. It will be recognized and understood that this particular Z-shape illustrated is designed to accommodate the elevation of the seat 22 over the toilet bowl and is not essential to the use of this invention with other stationary and portable members, which are in co-planar alignment for instance. However, it is necessary that the bracket provide means for attachment to the portable member, such as the illustrated spaced seat screw or bolt fastener openings 33 in attachment portion 32, as well as means for supporting the slide bar 23.

Figure 6:
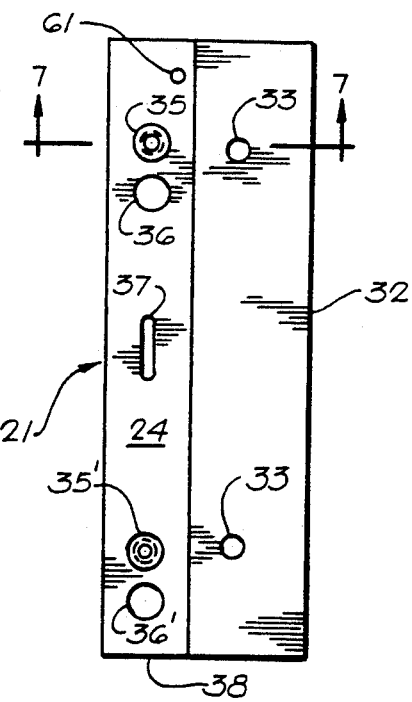
FIG. 6 is a top plan view of the mounting bracket shown in FIG. 1 for connection to a portable member.

With respect to the slide bar supporting requirement it will be noted from FIGS. 6 and 7 that platform portion 24 is fitted with two vertically extending large headed pins 35, 35 which project upwardly near the opposite ends of portion 24 and are staked, or otherwise anchored in place. Portion 24 is also formed with two through openings 36, 36', closely adjacent pins 35, 35 and aligned with the latter. Medially of the platform portion is an elongated slotted opening 37 aligned along a lengthwise axis of the platform portion and coaxially of openings 36, 36' and pins 35. It will be noted also in reference to such pins and openings that the latter are disposed on the same side of the two pins so that one opening 36 is located between pins 35 while the other opening 36' is located between one end 38 of platform portion 24 and the adjacent pin 35.

Figure 4:
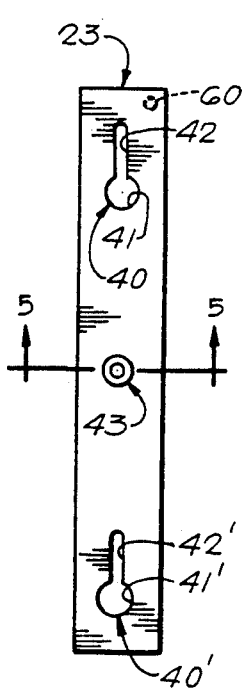
FIG. 4 is a top plan view of the slide bar, seen in FIG. 1, for interlocking the mounting bracket and mounting plate.

With reference to FIGS. 4 and 5, the features of the slide bar 23 will be recognized. As shown bar 23 has an elongated planar body which is substantially coextensive with platform portion 24 of the described mounting bracket except that the length of bar 23 is shorter than the length of platform portion 24 to accommodate sliding movement of the bar within the length of platform portion 24.

Adjacent the out ends of bar 23 are a pair of like oriented key hole slot or openings 40, 40', having enlarged end portions 41, 41' and elongated portion 42, 42', respectively. It will be noted that the elongated portions of the key hole openings extend from like sides of the enlarged portions thereof.

In addition to the two key hole openings which are aligned along a common longitudinal axis of the slide bar, the latter also is equipped with a generally cylindrical actuator pin 43 having a rounded outer end and a reduced diameter stem portion 44 that extends through a centrally located opening in bar 23 and is of a length to extend past the operationally bottom face of that bar as clearly shown in FIG. 5. The purpose of this depending extension of portion 44 is to provide a guide system with platform portion 24 of the mounting bracket. Specifically stem 44 is arranged to enter the elongated medial slot 37 of portion 24 when bar 23 is mounted over such platform portion. This is accomplished by dropping the enlarged end portions 41, 41' of the key hole openings in the slide bar over the upstanding pins 35, 35 fixed to platform portion 24 and then shifting bar 23 longitudinally until the pin portion 44 enters slotted opening 37. The spacing between parts is such that the shifting movement of the bar serves to capture bar 23 beneath the heads of the pins 35 with relatively close clearance and alignment of the pins, key hole slots and medial slot so that once assembled, the slide bar is not readily detachable from the platform portion 24.

With reference now to FIGS. 2 and 3, the features of the mounting plate 26 are readily apparent as comprising a rectangular body 46 of the same length as mounting means 21 and having a pair of laterally spaced through holes 47, 47 for fastening the same to a toilet. Just rearwardly of the toilet bowl. The holes 47, 47 are spaced to fit the normal seat bolt openings in the toilet base and in the normal installation of the connector assembly hereof the mounting bolts associated with a conventional hinged toilet seat are employed to fastener plate 26 in place. This arrangement permit the hinged toilet seat to remain in a normal raised position on the toilet when the disabled user seat 22 is present while affording conventional use of the toilet by others when the elevated disabled user seat is removed by appropriate operation of the connector assembly 20 hereof.

Mounting plate 26 importantly is equipped with a pair of laterally spaced locking posts 48, 48' fixed in place adjacent one edge of plate 26 which is operatively positioned opposite the mounting means 21. Such posts are aligned for registering reception in openings 36, 36' formed through platform portion 24 of the mounting bracket whereby the latter may be superposed on the mounting plate so that the posts 48, 48' extend through the openings 36, 36' and the enlarged ends of the key hole slots 40, 40' in the slide bar. As seen best in FIG. 7 each locking post is formed with a generally cylindrical body 49, reduced in diameter at its lower end to form a cylindrical mounting stem 50 which is staked or otherwise fixed to plate 26 to anchor the posts in place. The body portion 49 of each post is further undercut adjacent its upper end to provide an indented annular shoulder beneath a rounded head 51 at its outer end which is operable to self guide the posts through the openings 36, 36' and 41, 41' when assembling the mounting bracket means 21 over the mounting plate (see FIG. 8). It further is to be noted that the axial spacing between the upper end of the cylindrical body portion 49 and the bottom of the head portion 51 is slightly less than the thickness of the slide bar 23. Consequently the sloping cam surfaces 52 engage the upper face 53 of the slide bar when the latter is moved beneath the heads 51 to clamp the opposing faces of the slide bar, platform portion 24 and mounting plate 26 tightly together with frictional engagement in operation, as will be recognized from FIG. 10 of the drawings.

Turning now to FIGS. 1 and 8-12 the features of assembly 20 will be recognized as including the assembled parts 21, 23 and 26 as hereinabove described as well as the actuator means 25 for operating the slide bar.

As best shown in FIGS. 8 and 9, means 25 comprises a crank lever 55 pivotably joined to the body 31 of the mounting means 21 by means of a pivot 56 located intermediate the ends of such lever, and removeably connected to body portion 31 to facilitate disassembly. The upper end of lever 55 is provided with a manually engageable tab 57 and the lower end thereof is formed with a parallel outwardly turned actuating ear 58, having a slightly elongated oval slot or opening 59 receptive of the upper end of the actuator pin 43. When the mounting means connector platform 30 is assembled with the slide bar 23, actuator pin 43 on the latter extends into opening 59 whereby pivotal activation of the lever 55 causes the slide bar to move rectilinearly as limited by posts 48 and pins 35 to engage or disengage the heads 51 of the posts 48. It will be noted that when lever 55 is raised to its dotted line position as shown in FIG. 8, the slide bar is disengaged from beneath the heads of the posts 48 and the operating tab is clearly visible to indicate the unlocked condition of the connector assembly. It also is to be noted that the extent of the opening 59 also serves to limit the pivotal throw of lever 55 while maintaining the pin 43 engaged with the lever ear 58.

It will be appreciated that although the actuator means 25 is herein illustrated and described as a pivotal lever, such an arrangement is not essential to the workability of the connector assembly combination of this invention and consequently equivalent forms of actuator means may be readily substituted for that shown.

If desired, detent means may be provided to maintain the connector assembly in an unlocked condition as when the same has been removed. To this end, a protrusion 60 on the underface of the slide bar is provided to enter an opening 61 formed in the platform portion 24 of the mounting means when the slide bar is moved to its unlocked position whereat the heads of the connector posts register with the large key hole openings 41, 41' in the slide bar.

From the foregoing it is believed that those familiar with the art will readily appreciate the novel advancement of this invention over the prior art and will understand that the same is not limited to the specifics of the described embodiment but is susceptible to modification and substitute of parts and equivalents without departing from the spirit and scope of the invention which is intended to be unlimited except as may appear in the following appended claims.

The embodiments of the invention in which an exclusive property or privilege is claimed are defined as follows:

1. A connector assembly for detachably interjoining a portable member to a stationary member, comprising:

mounting means having an attachment portion for fixed connection with the portable member and a planar platform portion for detachable connection with the stationary member;

an elongated slide bar superposed on said platform portion;

means on said platform portion for slidably securing said slide bar thereto for rectilinear movement;

a planar mounting plate having means for affixing the same to the stationary member and additional means for detachably securing the same to said platform portion;

means on said plate member for effecting detachable connection with said slide bar in a first position of movement of the latter and clamping connection therewith in a second position of movement of said bar, and actuator means for selectively moving said slide bar to and between said first and second positions.

2. The combination of claim 1 and detent means for arresting said slide bar in said first position.

3. The combination of claim 1, wherein said attachment portion of said mounting means is integral with said platform portion thereof.

4. The combination of claim 2, wherein said platform and attachment portions are in parallel spaced relation.

5. The combination of claim 1, wherein said means for slidably securing said slide bar to said platform portion comprises headed pins projecting from said platform portion for engagement with slotted openings in said slide bar.

6. The combination of claim 1, wherein said means for detachably securing said platform portion to said plate member comprises spaced posts projecting from one face of said plate member for registering passage through openings formed through said platform portion.

7. The combination of claim 6, wherein said means for effecting detachable connection with said slide bar, comprise headed portions at the outer ends of said posts which are insertable through enlarged openings of key hole slots formed through said slide bar; reduced portions of said posts beneath said headed portions entering elongated portions of said key hole slots in response to movement of said slide bar to said second position whereat said headed portions prevent detachment of said mounting means from said mounting plate.

8. The combination of claim 7, wherein said headed portions of said posts are formed with camming surfaces interferingly engageable with said slide bar when the latter is moved to said second position whereby to effect said clamping connection.

9. The combination of claim 1, wherein said actuator means comprises a pivotal lever engageable with an actuator pin on said slide bar and operable to effect limited rectilinear movements of said bar in response to selected operation of said lever.

10. The combination of claim 1 and guide means associated with said platform portion and slide bar cooperable to guide the latter for rectilinear movement.

* * * * *

UNITED STATES PATENT AND TRADEMARK OFFICE
CERTIFICATE OF CORRECTION

PATENT NO. : 5,141,354

DATED : 8/25/92

INVENTOR(S) : Carl E. Morsbach

It is certified that error appears in the above-identified patent and that said Letters Patent is hereby corrected as shown below:

Col. 4, line 32, at the end of the line, delete "7" and insert -- 3 --.

Signed and Sealed this

Twenty-third Day of November, 1993

Attest:

BRUCE LEHMAN

Attesting Officer

Commissioner of Patents and Trademarks